Feb. 17, 1970          C. D. LOWERY                3,496,348
                    SEWER INSPECTION DEVICE
Filed April 10, 1967                        2 Sheets-Sheet 1

INVENTOR
CARTHEL D. LOWERY

BY Semmes & Semmes
ATTORNEYS

Feb. 17, 1970   C. D. LOWERY   3,496,348
SEWER INSPECTION DEVICE

Filed April 10, 1967   2 Sheets-Sheet 2

INVENTOR
CARTHEL D. LOWERY
BY Semmes & Semmes
ATTORNEYS

United States Patent Office 3,496,348
Patented Feb. 17, 1970

3,496,348
SEWER INSPECTION DEVICE
Carthel D. Lowery, 921 Coral Drive,
West Palm Beach, Fla. 33406
Filed Apr. 10, 1967, Ser. No. 629,614
Int. Cl. F21l *1/00;* F21v *33/00;* B60q *1/26*
U.S. Cl. 240—2.18                          3 Claims

ABSTRACT OF THE DISCLOSURE

A searching, scanning device for the engineer, which is especially useful during inspection of dark vessels, sewers and related underground utilities. Its components include a collapsible viewing tube at the lower end of which there depends a mirror section. Outside this section there is placed a light, the mirror and light being directed to illuminate and reflect the scene within the area to be inspected. Light controls are located at the upper end of the tube and a conduit retrieval device for the wires leading to the light source is provided.

BACKGROUND OF THE INVENTION

The present invention relates generally to a sewer inspection device, particularly a periscope characterized by its simplicity in construction, portability and ease of use.

The following U.S. Patents are a list of pertinent prior art: Parrish, 689,220; Pino, 849,570; Dixon, 1,035,426; and Shaw, 2,968,208.

SUMMARY OF THE INVENTION

The sewer "inspector" of the present invention consists generally of a group of telescoping sections terminating at one end in a mirror section provided with an inspection light and at the other end in a viewing section provided with an electrical switch for actuating the light and a spring loaded reel for tensioning the lamp wiring. Crimp-type indentations are provided in the sections of the "inspector" to permit locking in telescoped position.

DESCRIPTION OF THE PREFERRED EMBODIMENTS

Figure 1:
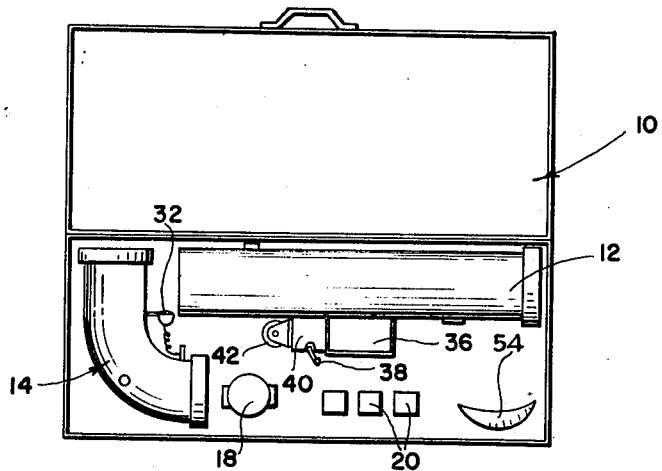
FIGURE 1 is a top view of the sewer inspection device collapsed, dis-assembled and stored within a carrying case.

As seen in FIGURE 1, the sewer inspection periscope of the present invention may be collapsed, dis-assembled and stored within a carrying case 10. In particular, the telescoping sections are collapsed within the terminal viewing section 12 while mirror section 14 is entirely dis-assembled from the other sections. Provision is also made to store eye shade 16, extra mirror 18 and extra batteries 20. In this manner, ease in carrying the components of the sewer inspection device is assured.

Figure 2:
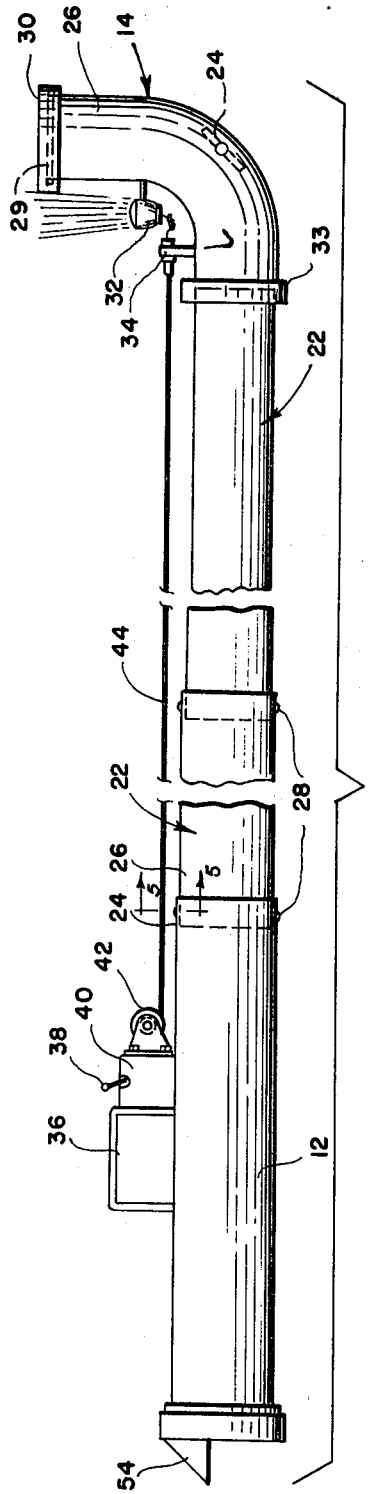
FIGURE 2 is a side view of the sewer inspection device assembled and extended for use.
Figure 5:
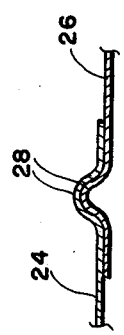
FIGURE 5 is a sectional view taken along line 5—5 of FIGURE 2 illustrating the typical crimp type indentations for locking adjacent sections of the periscope.

In FIGURE 2, the components are assembled and the telescoping sections 22 fully extended. Although not shown, it is contemplated that there will be approximately nine sections, each being approximately 2 feet, 6 inches in expense. Thus, the periscope will measure approximately 20 feet fully extended and slightly greater than 2 feet, 6 inches collapsed. As seen in FIGURE 5, the other and inner ends 24 and 26, respectively, of each of the adjacent sections 22 are provided with crimp-type indentations 28, permitting sections 22 to be locked into telescoped position. Sections 22 are constructed of plastic or light gauge metal such as aluminum, and the diameters designed such that the entire unit can be telescoped without undue strain—while resisting collapse until substantial pressure is exerted.

Mirror section 14 is provided with mirror 24 fixed at an angle of 45° with respect to the axes of the tubular ends thereof. Within the terminal end 26 of mirror section 14 may be mounted non-reflecting glass lens 29 secured by a removable collar 30. Although glass 29 serves to keep mirror 24 clean, substantial variations in temperature between the inside and outside of sections 22 may cause fogging, in turn dictating the removal of glass 29. A waterproof inspection light 32 is mounted upon mirror section 14 and provided with a waterproof plug 34 of conventional design permitting electrical dis-assembly when desired. Finally, collar 33, which is formed as an integral part of mirror section 14 secures mirror section 14 to adjacent section 22.

Figure 3:
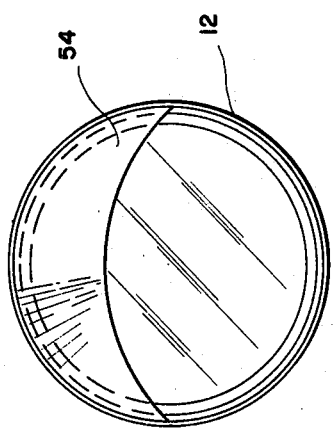
FIGURE 3 is a front view of the viewing section of the periscope.
Figure 4:
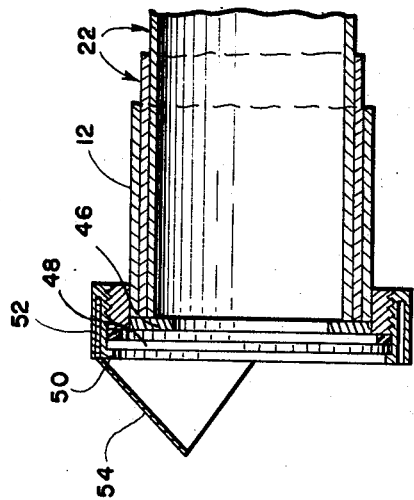
FIGURE 4 is a side view in section illustrating a portion of the viewing section of the periscope.

Viewing section 12, as seen in FIGURE 2, is provided with carrying handle 36, toggle switch 38 for actuating inspection light 32, waterproof battery enclosure 40 and spring loaded reel 42 carrying the lighting wiring 44. As will be apparent, wiring 44 is kept taut by the tension exerted by spring loaded reel 42 when sections 22 are either assembled or collapsed or collapsed. As seen in FIGURES 3-4, the end of viewing section 12 is provided with a stop ring 46 against which telescoped sections 22 abut so as to prevent breaking glass less 48 which is similar in purpose to glass 29 of mirror section 14. As before, lens 48 may be eliminated if desired. Finally, a removable collar 50 secures glass lens 48 is place and, in addition, is provided with groove 52 within which rotating eye shade 54 is inserted. Eye shade 54 may be plastic and is, of course, removable.

Figure 6:
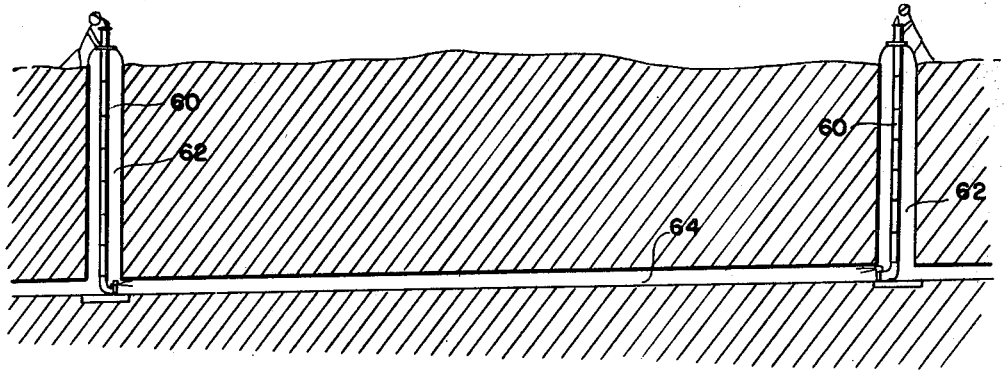
FIGURE 6 is a side view in section illustrating typical application of the sanitary sewer inspection system.

As illustrated schematically in FIGURE 6, extended periscopes, generally designated by reference numeral 60 are used in adjacent manholes 62 to inspect sewer pipe 64. As ach "inspector" periscope may be manually extended and collapsed and subsequently stored within carrying case 10 ease in use and portability is assured.

I claim:
1. A sewer inspection device comprising:
  (A) a right angled tubular mirror section including a mirror mounted therein at the apex of the angle together with an inspection light mounted adjacent the mirror exteriorly of said tubular mirror section, said mirror and light being directed at right angles to a viewing section; and being curvilinear in configuration and together with said mirror providing a change in direction of light through approximately 90°; said means for locking said sections in extended position including pairs of crimp-style indentations located at the ends of adjacent tubular sections;
  (B) a viewing section including electrical switch means for actuating said light together with a spring loaded reel carrying electrical wire connecting said light switch and a source of electricity;

(C) a plurality of telescoping tubular sections connecting said viewing and mirror sections and means for locking said sections in extended position; and (D) an eye shade together with means permitting same to be rotated and removed from the end of the viewing section.

2. A sewer inspection device as in claim 1, including glass lenses mounted upon the open ends of said viewing and mirror sections with means for removing same when desired.

3. A sewer inspection device as in claim 2, including a carrying case with compartments for the tubular sections telescoped within the viewing section and the disassembled mirror section.

References Cited

UNITED STATES PATENTS

| | | | |
|---|---|---|---|
| 2,028,430 | 1/1936 | Baddorf et al. | 240—2.18 XR |
| 2,196,936 | 4/1940 | Nash | 240—2.18 |
| 2,228,009 | 1/1941 | Harford | 240—2.18 XR |
| 2,968,208 | 1/1961 | Shaw | 350—52 |
| 3,319,061 | 5/1967 | Pohl et al. | 240—8.18 XR |

NORTON ANSHER, Primary Examiner

R. P. GREINER, Assistant Examiner

U.S. Cl. X.R.

240—6.4, 8.18, 12